US 6,698,404 B2

(12) United States Patent
Palkowitsh

(10) Patent No.: US 6,698,404 B2
(45) Date of Patent: Mar. 2, 2004

(54) AIR-NATURAL GAS CARBURETOR

(76) Inventor: Charles H. Palkowitsh, 4580 W. Jones Ave., Garden City, KS (US) 67846

( * ) Notice: Subject to any disclaimer, the term of this patent is extended or adjusted under 35 U.S.C. 154(b) by 15 days.

(21) Appl. No.: 10/183,285

(22) Filed: Jun. 27, 2002

(65) Prior Publication Data

US 2004/0000295 A1 Jan. 1, 2004

(51) Int. Cl.$^7$ .................................................. F02B 43/00
(52) U.S. Cl. ....................................... 123/527; 123/530
(58) Field of Search ............................ 123/27 GE, 527, 123/530

Primary Examiner—Noah P. Kamen
(74) Attorney, Agent, or Firm—Edward L. Brown, Jr.

(57) ABSTRACT

An air-natural gas carburetor for a constant load stationary internal combustion engine including an air inlet passage connected to the intake manifold of an engine, a manually-controlled air valve in the inlet passage, a gas inlet conduit entering the air inlet passage and terminating in a discharge opening; a downstream pressure gas regulator supplying a constant gas pressure to the gas conduit and a manually-controlled valve in the gas conduit between the pressure regulator and the discharge opening which is independent in operation from the air valve.

12 Claims, 2 Drawing Sheets

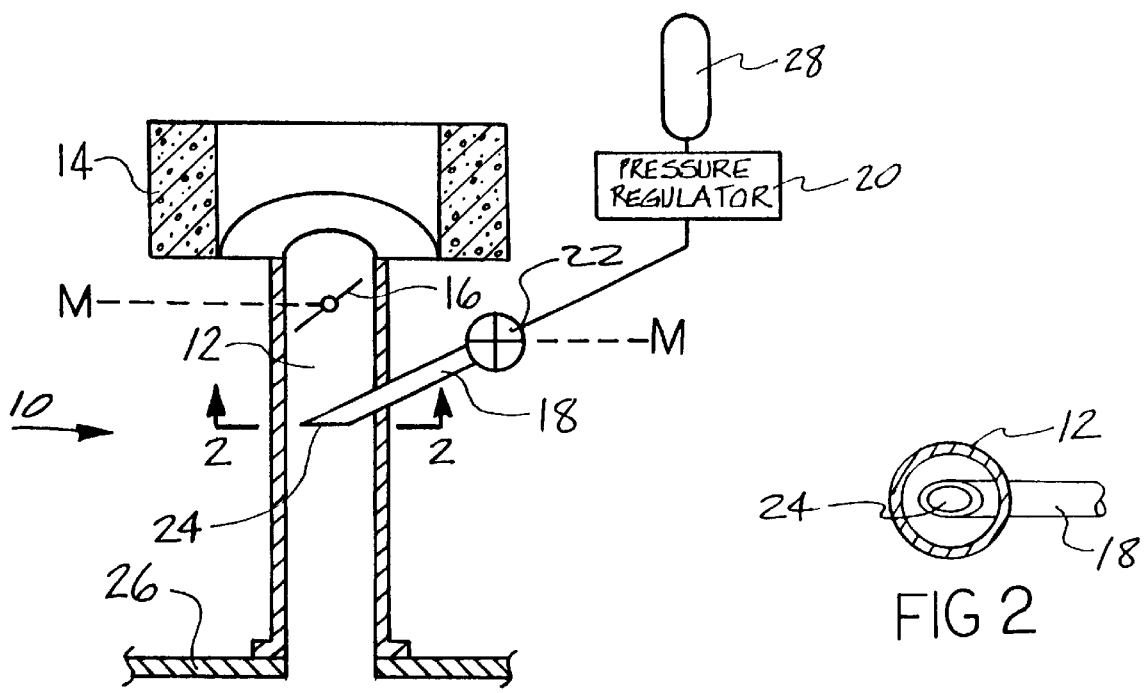
FIG 1
FIG 2
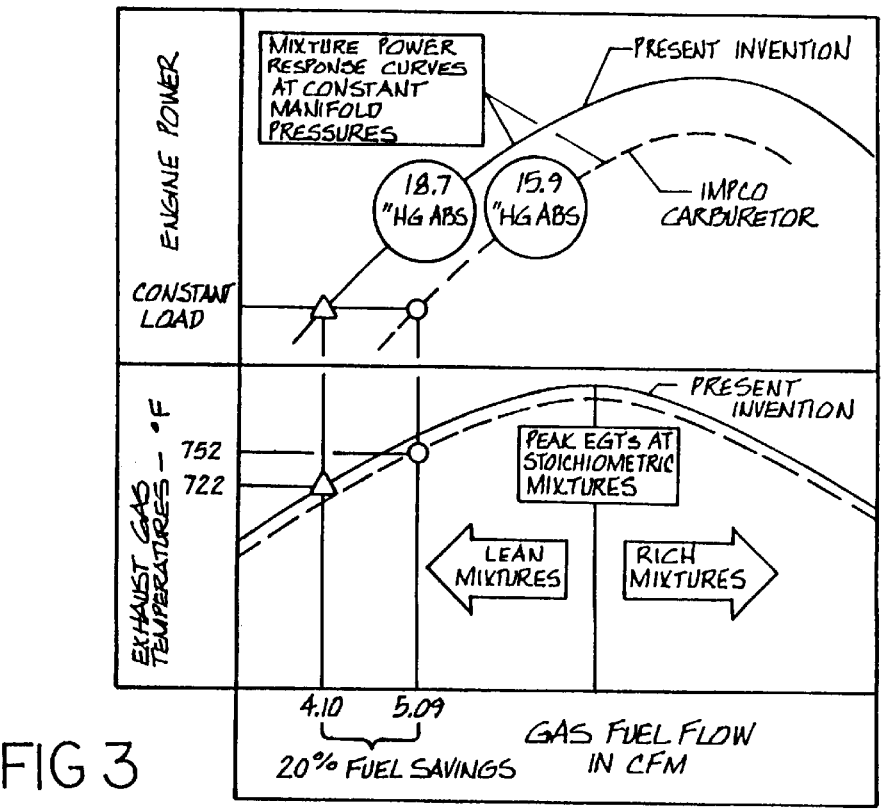
FIG 3

AIR-NATURAL GAS CARBURETOR

BACKGROUND OF THE INVENTION

This invention relates generally to an air-natural gas carburetor of the type that are used to mix air and gaseous fuel such as CNG (natural gas); and, more particularly, to a stationary engine application on an irrigation well with a constant load which supplies a rotary walking sprinkler. The air and gas valves controlling the air/fuel ratio of the fuel charge are separately manually controlled.

Mixing devices generally referred to as carburetors, for mixing air with a gaseous fuel, are well known in the prior art and such devices are commonly attached to the intake manifold of an internal combustion piston engine in lieu of a conventional liquid fuel carburetor, which would normally operate the engine. In the operation of such carburetors, also referred to as air/gas carburetors, the mixing of air and gaseous fuels needs to be in a generally proper ratio for a particular engine load and speed. In the gaseous fuel carburetors currently on the market, the amount of air and the amount of fuel are controlled by valves that are positioned by the engine manifold pressure. The air and gas valves within these prior art carburetors typically are tied together so that at various throttle settings, the mixture of the air/fuel charge remains relatively uniform.

The present invention deviates from this conventional approach in that the air-flow valve and the fuel-flow valve are independently manually controlled which is a concept not followed in carburetor design.

In a typical prior art air/gaseous fuel carburetor, shown in U.S. Pat. No. 3,545,948, the gas valve is actuated by use of a diaphragm operated by vacuum pressure from the engine which is sensed from the intake manifold. The diaphragm opens the gas valve in response to vacuum manifold pressure and the degree of the valve opening is controlled by manifold pressure. Since the air and gas valves move together the air/fuel mixture at any given manifold pressure is relatively uniform.

In a later air/gas carburetor, shown in U.S. Pat. No. 4,694,811, the air and fuel valves also move together subject to manifold pressure but also include a stepper motor that adjusts the fuel valve alone to vary the fuel/air mixture. This design is intended to deal with the differing b.t.u. content of the gaseous fuel which requires adjustments to the fuel/air mixture ratio for any given engine load when the fuel is changed.

In more recent air/gas carburetors, such as U.S. Pat. No. 5,809,970, the control is completely automatic with the use of mass flow rate sensors which sense the mass flow rate of both the aspirated air and injected fuel, and generate a control signal for each fuel and air valve to maintain the optimum stoichiometric ratio for the air and natural gas which adjusts at every change in throttle position of the engine.

SUMMARY OF THE PRESENT INVENTION

All current gaseous fuel carburetors on the market utilize manifold pressure as a power source to adjust the air and gaseous fuel valves and rates of flow found in the carburetor. The present invention utilizes manual adjustment of both the air and gaseous fuel valves separately to obtain a minimum of fuel usage with the leanest fuel-air ratio.

The carburetor of the present invention is utilized on internal combustion reciprocating piston engines which operate at a constant load while driving turbine type irrigation pumps. These irrigation pumps operate at a constant rpm and have an unchanging load for each location since the lift of the pump or head is constant along with the pressure to move the water through the irrigation sprinkler system. These pumps are also used for a flood irrigation system. Contrary to most power supply systems, the pumps operated by the present invention have a constant load and there is no requirement for changing the air valve or gas valve settings other than the start up and the shut down of the pump, which is achieved by closing the gas valve.

The primary object of the present invention is to provide air-natural gas carburetor that operates with a minimum amount of fuel for each gallon of water pumped.

Another object of the present invention is to provide a simplified carburetor design which entails merely two manually controlled valves and a downstream gas pressure regulator without any of the automatic controls normally utilized in current air-gaseous fuel carburetors on the market.

Another object of the present invention is to provide instrumentation with the carburetor to achieve an optimum air-fuel ratio.

A further object of the present invention is to provide an air-gaseous fuel carburetor that is economical to manufacture and to run relatively maintenance free.

For a better understanding of the nature and objects of the invention, reference is made to the following detailed description taken in connection with the accompanying drawings in which:

FIG. 1 is a diagrammatic view of the air-gaseous fuel carburetor with parts shown in section and parts shown symbolically;

FIG. 2 is a sectional view along lines 2—2 of FIG. 1;

FIG. 3 is a graph illustrating the gas savings of the present invention compared with a prior art air/gas carburetor.

DESCRIPTION OF THE PREFERRED EMBODIMENT

Figure 4:
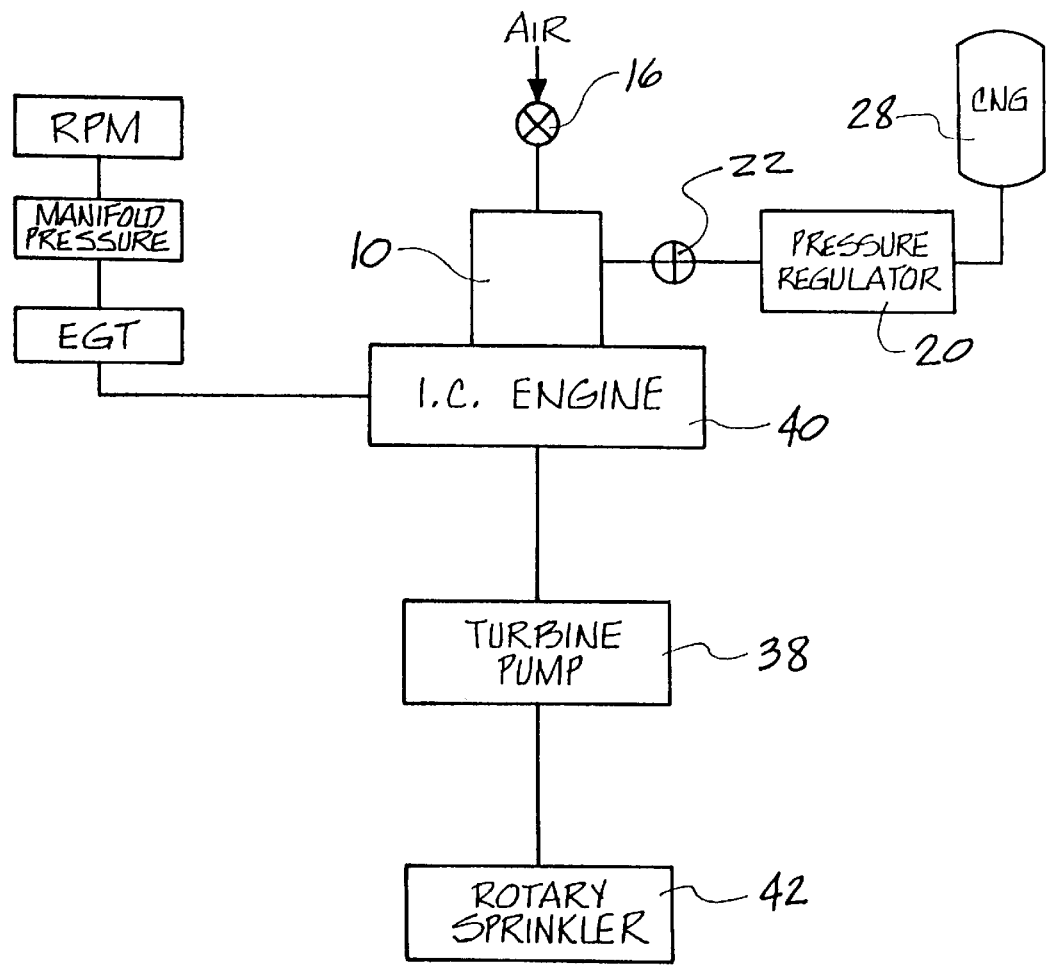
FIG. 4 is a diagrammatic view of a rotary sprinkler irrigation system including a pump, engine, carburetor and mixture instrumentation.

Referring now to the drawings in detail, as illustrated in the preferred embodiment, the air-gaseous fuel carburetor of the present invention is generally identified by reference numeral 10, in FIG. 1. The carburetor 10 comprises an air inlet passage 12 that draws air through an air filter 14. Air inlet passage 12 connects with the engine intake manifold 26 of any conventional piston engine and is sized in diameter to the opening of the intake manifold. For example, a modified automotive 262 cubic inch General Motors V6 engine can be utilized which has special high temperature exhaust valves and the conventional gasoline carburetor is replaced by the carburetor 10 of the present invention.

Air inlet passage 12 includes a conventional butterfly valve 16 located upstream of the intake manifold 26. Valve 16 is manually set by the operator through any type of actuator extension control well known in the art. Positioned downstream of air valve 16 is a fuel inlet conduit 18 that terminates in the center of passage 12 with a discharge opening 24 directed downstream. Fuel conduit 18 is supplied with pressurized natural gas from a reservoir or source 28 that passes through downstream pressure regulator 20. Also positioned in conduit 18 is a manually controlled gas valve 22 that can be of a variety of types including needle and gate valves. The pressure regulator 20 provides a constant downstream pressure with a range between 5 oz. and 15 oz. per square inch of pressure which is maintained on the upstream side of valve 22 regardless of the flow rate of valve 22. The relative inside diameter of the air inlet passage 12 to the fuel conduit 18 is approximately 3:1.

The distance between the gas discharge opening 24 downstream to the intake manifold 26 should be no less than 5 inches unless there is some form of air/gaseous fuel mixing structure included.

FIG. 4 symbolically illustrates the complete irrigation system in which the air-fuel gas carburetor is utilized. The size of the engine is determined by the lift and flow requirements of the rotary walking sprinkler system and can vary substantially in size. The irrigation pump 38 is a turbine type pump located at the water level and is supplied by the drive shaft connected to the stationary internal combustion engine 40 positioned adjacent to the water well casing. The flow requirements of the sprinkler system vary with the system but basically call for a certain gallonage of flow at a certain pressure. These water wells vary in depth between 50 feet and 400 feet and require sufficient horsepower to lift the water from the bottom of the well and the additional horsepower to maintain a certain pressure in the walking sprinkler system 42 to achieve a uniform water coverage over the total circular area being irrigated. The manually controlled air valve 16 basically controls the rpm of the engine while the manually controlled gas valve 22 varies the air to fuel ratio which is adjusted in accordance with the exhaust gas temperature (EGT) sensed in the exhaust gas manifold of the engine.

Operation of the carburetor is achieved by initially setting the air valves 16 in a halfway open position. The gas valve is then opened for three seconds and closed so as to fill the air inlet passage 12 and the intake manifold 26 partially with natural gas. The engine starter is engaged and as the engine begins to fire, the gas valve 22 is then partially opened so that the engine will continue to run. The air valve 16 is further adjusted open to achieve the desired rpm setting. The engine is instrumented for manifold pressure, RPM and EGT. The above-mentioned engine operates in a rpm range of 1800 to 2200 and the turbine pump operates in a range between 1500 and 1800 rpm through a gear reduction. The air flow valve 16 basically sets the rpm. The final adjustment is made to the gas valve 22, which is leaned to the peak side of peak exhaust gas temperature and during operation is monitored by the EGT sensor.

FIG. 3 illustrates a comparison of the present invention carburetor with a prior art IMCO carburetor Model 225, both at a constant load and manifold pressure. The exhaust gas temperature of the present invention of 722 degrees F. is less than the prior art IMPCO carburetor by 30 degrees F. with a 20% savings of gas fuel burned.

Figure 5:
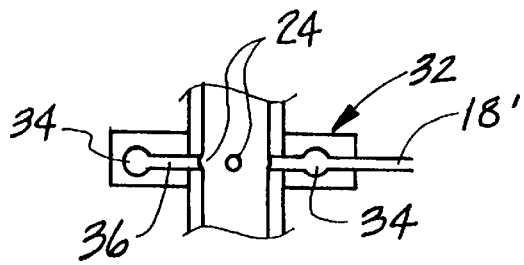
FIG. 5 illustrates modified gas discharge openings into the air inlet passage.

FIG. 5 illustrates a modified gas discharge opening wherein fuel conduit 18' supplies a ring-shaped manifold 32 which has a circular passage 34 which supplies four radially spaced passages 36 opening into the air inlet passage 12 laterally to optimize the mixing of air and gaseous fuel. The radial passages 36 could be increased in number to enhance the mixing.

The fuel source can be well head gas, liquid propane or any other combustible gas or gas mixture.

Having described my invention with the particularities set forth above, what is claimed is:

1. An air-natural gas carburetor for a constant load stationary internal combustion engine having an intake manifold comprising:

an air inlet passage having a relatively constant inside diameter connecting atmospheric air to the intake manifold;

a manually controlled air valve in the air inlet passage;

a gas inlet conduit entering the air inlet passage and terminating in a discharge opening in the air inlet passage;

a downstream pressure gas regulator supplying a constant gas pressure to the gas conduit in a range of 5 oz. to 15 oz. per square inch;

a manually controlled valve in the gas conduit between the pressure regulator and the discharge opening which is independent in operation from said air valve.

2. An air-natural gas carburetor, as set forth in claim 1, where the downstream end of the air inlet passage which connects with the intake manifold is at least two inside diameters of the air inlet passage from the discharge opening of the gas conduit.

3. An air-natural gas carburetor, as set forth in claim 1, wherein the gas conduit discharge opening is directed laterally to the air flow in the inlet conduit.

4. An air-natural gas carburetor, as set forth in claim 1, wherein the air valve is located upstream of the gas conduit discharge opening and the gas discharge opening is located upstream at least two inside diameters of the air inlet passage from the intake manifold of the engine.

5. An air-natural gas carburetor, as set forth in claim 1, wherein the ratio of the inside diameter of the gas conduit to the air inlet passage is between 1–2 and 1–5.

6. An air-natural gas carburetor, as set forth in claim 1, wherein the gas regulator supplies a constant pressure of 10 oz. per square inch±2.

7. An air-gaseous fuel carburetor for a constant load stationary internal combustion engine having an intake manifold comprising:

an air inlet passage connecting to atmospheric air at its upstream end and to the intake manifold at its downstream end;

a manually controlled air valve in the air inlet passage;

a gas inlet conduit entering the air inlet passage and terminating in a discharge opening directed downstream in the air inlet passage;

a downstream pressure gas regulator supplying a constant gas pressure to the gas conduit;

a manually controlled valve in the gas conduit between the pressure regulator and the discharge opening which is independent in operation from said air valve.

8. An air-gaseous fuel carburetor, as set forth in claim 7, where the downstream end of the air inlet passage is at least two inside diameters of the air inlet passage from the discharge opening of the gas conduit.

9. An air-gaseous fuel carburetor, as set forth in claim 7, wherein the gas conduit discharge opening is directed laterally to the air flow in the inlet conduit.

10. An air-gaseous fuel carburetor, as set forth in claim 7, wherein the air valve is located downstream of the gas inlet conduit and the gas conduit discharge opening is located upstream at least three inside diameters of the air inlet passage from the intake manifold of the engine.

11. An air-gaseous fuel carburetor, as set forth in claim 7, wherein the ratio of the inside diameter of the gas conduit to the air inlet passage is between 1–2 and 1–5.

12. An air-gaseous fuel carburetor, as set forth in claim 7, wherein the gas regulator supplies a constant pressure of 10 oz. per square inch ±2.

* * * * *